(12) United States Patent
Scott

(10) Patent No.: US 6,675,059 B2
(45) Date of Patent: Jan. 6, 2004

(54) METHOD AND SYSTEM FOR ON-LINE SHEET METAL NESTING

(75) Inventor: William Scott, Weidman, MI (US)

(73) Assignee: Delaware Capital Formation Inc., Wilmington, DE (US)

(*) Notice: Subject to any disclaimer, the term of this patent is extended or adjusted under 35 U.S.C. 154(b) by 133 days.

(21) Appl. No.: 10/025,365

(22) Filed: Dec. 19, 2001

(65) Prior Publication Data

US 2003/0114952 A1 Jun. 19, 2003

(51) Int. Cl.[7] ............................................. G06F 19/00
(52) U.S. Cl. ........................ 700/166; 700/97; 700/182
(58) Field of Search ................... 700/96, 97, 117, 700/131, 134, 135, 145, 159, 160, 166, 171, 173, 180, 181, 182–185; 703/1

(56) References Cited

U.S. PATENT DOCUMENTS

| | | | | |
|---|---|---|---|---|
| 5,023,800 A | * | 6/1991 | Carver et al. ................ | 700/182 |
| 5,172,326 A | * | 12/1992 | Campbell et al. ............ | 700/134 |
| 5,703,781 A | * | 12/1997 | Martell et al. ............... | 700/135 |
| 5,815,683 A | * | 9/1998 | Vogler .......................... | 709/217 |
| 5,920,480 A | * | 7/1999 | Nakamura et al. ........... | 700/114 |
| 6,061,603 A | * | 5/2000 | Papadopoulos et al. ....... | 700/83 |
| 6,127,648 A | * | 10/2000 | Scott ..................... | 219/121.67 |
| 6,560,499 B1 | * | 5/2003 | Demmer ....................... | 700/97 |
| 2002/0107607 A1 | * | 8/2002 | Sakai et al. .................. | 700/182 |

FOREIGN PATENT DOCUMENTS

JP    2002307175    * 10/2002

* cited by examiner

Primary Examiner—Leo Picard
Assistant Examiner—Paul Rodriguez
(74) Attorney, Agent, or Firm—Baker & Daniels

(57) ABSTRACT

A web interface allows users to automatically nest equipment parts. Necessary material and data information are generated and input to a CAD/CAM program that places the parts on one or more sheets of material. A laser program is also generated for laser to cut the parts according to the arrangement.

22 Claims, 5 Drawing Sheets

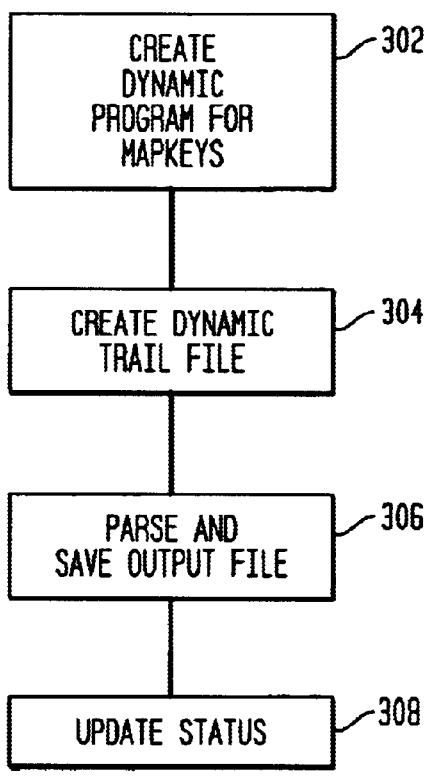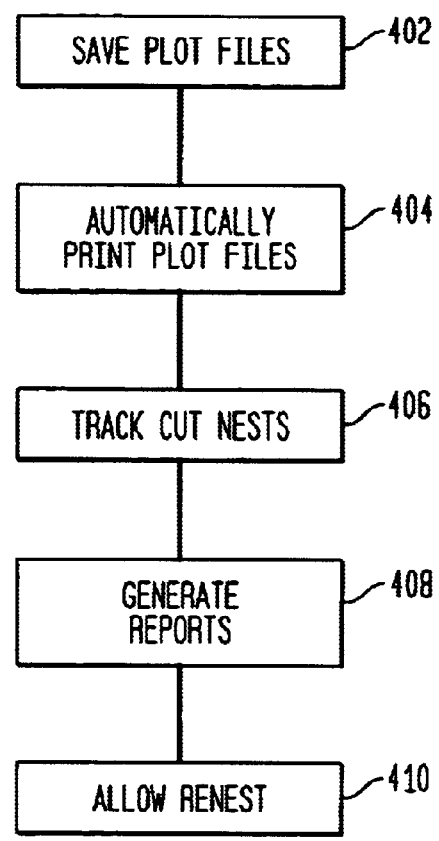

METHOD AND SYSTEM FOR ON-LINE SHEET METAL NESTING

TECHNICAL FIELD OF THE INVENTION

The present invention relates generally to equipment design and production, and particularly, to a system and method for automatically nesting sheet metal parts for assembly and presenting the parts to a user over a network when the user orders equipment for manufacture.

BACKGROUND OF THE INVENTION

In equipment manufacturing, nesting refers to the process of fitting together odd shaped parts on a sheet of material. It also includes placing small parts in the material cut out from larger parts. Typically, when a customer desires to order customized equipment for his or her business needs, the customer must first engage a sales person from the equipment manufacturer and provide the design specification including various configuration parameters for the equipment to fit the customer's business needs to the sales person. The sales person then takes the configuration parameters and provides them to a design engineer who designs the equipment, typically with aid of CAD/CAM (computer-aided design/computer aided manufacturing) tools. If the customer approves the design plan, the plan is sent to the manufacturing plant where equipment is built according to its design specification. Typically, the manufacturing process includes nesting in which parts are placed or fit on a sheet of material. A user ordering the equipment, however, does not have an easy access to the sheets that are being nested, and does not have control over which parts being placed on which material or sheet of material to be cut and assembled into equipment.

Accordingly, it is desirable to allow the user to view the sheet nesting mechanism and to specify parameters used in nesting such that the user may have control and interaction over the nesting mechanism. Preferably, the user is allowed to view and specify various parameters that affect the nesting, on-line and when the user configures the equipment for order.

Yet further, it is desirable to have a system that allows the nested parts information to be seamlessly transmitted to a laser or any other sheet cutting machine to begin the actual cutting process.

SUMMARY OF THE INVENTION

A web interface allows users to order customized equipments based on the customer supplied design specifications and also displays individual parts information associated with the equipment ordered. When a user enters an identifier for the order, the method and system of the present invention automatically generates individual parts that comprise the ordered equipment. The parts are then displayed on the user's web page. In one embodiment, nesting of parts is automatically initiated wherein the required parts are optimally placed on a sheet of steel for laser programs to cut the parts.

In one aspect, user is allowed to specify a group of parts needed via a web interface. The parts are then automatically placed on a sheet of material such as steel to utilize the sheet optimally, and laser program is generated for cutting the parts.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 3 is a flow diagram illustrating automatic nesting procedure in one embodiment of the present invention;

FIG. 4 is a flow diagram illustrating the post nesting procedure in one embodiment of the present invention;

DETAILED DESCRIPTION OF THE INVENTION

The present application describes an automated equipment manufacturing that allows users or customers to configure orders on-line. This application is related to co-pending U.S. patent application Ser. No. 10/024,109 entitled "Method and System for Designing and Ordering Products for Manufacture On-Line", which application is incorporated herein in its entirety by reference thereto. That application describes the automated method and system wherein a user or a customer may configure and place equipment orders on-line. In the method and system of the present application, when a user specifies the equipment configurations, e.g., size and type, sheet metal nesting is automatically performed and as a result, the sheet metal is ready for laser cutting.

In one embodiment, all inputs to the nesting interface are broken down to the part level. E.g., when a user enters an order number or order identifier ("id"), the id is received by the web interface and broken down to the list of individual parts that make up the overall order assembly and displayed back to the user as broken down parts list, e.g., when the web page refreshes.

Figure 1:
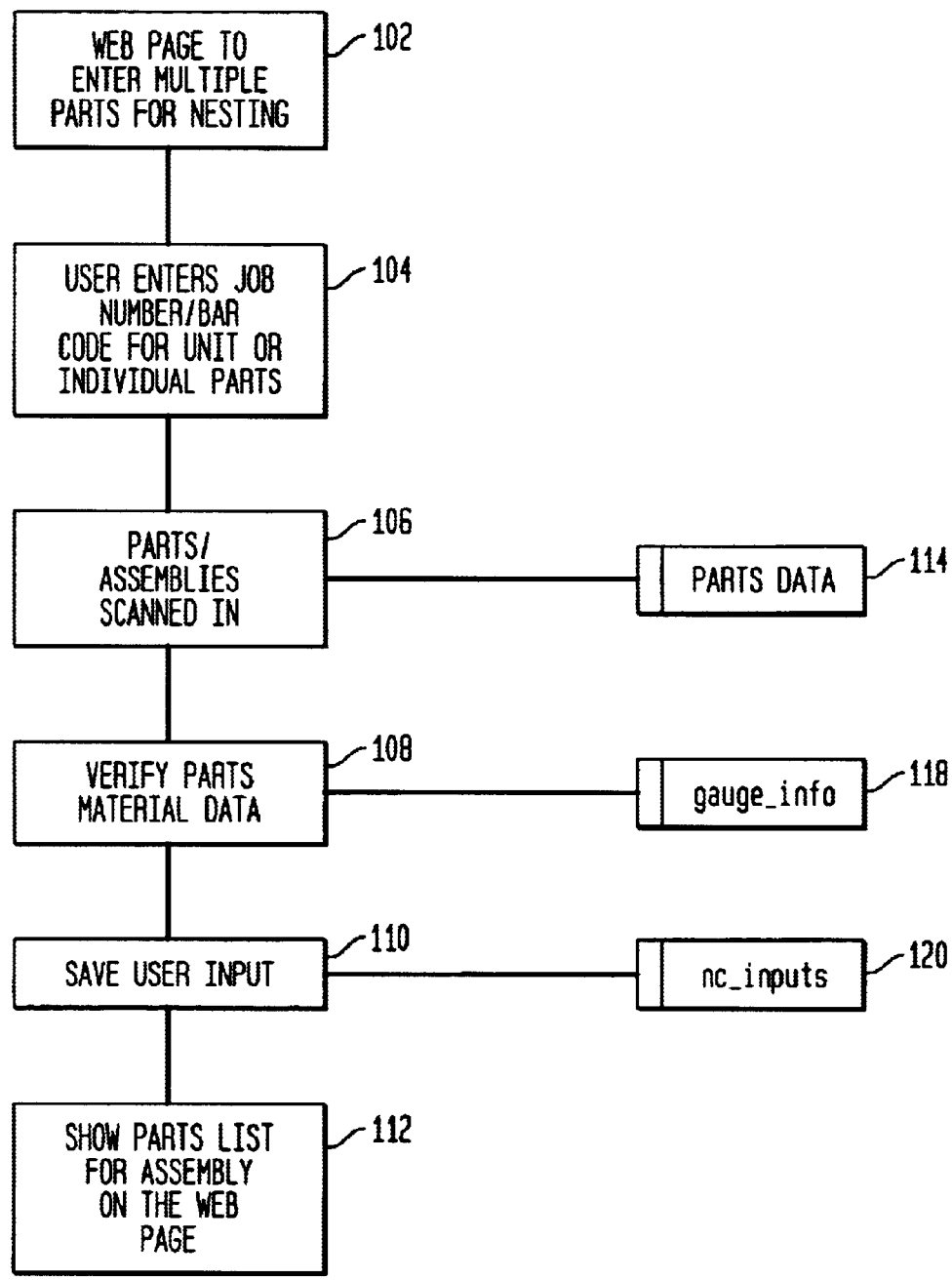
FIG. 1 is a flow diagram illustrating a web interface that receives user input and displays individual parts to the user.

FIG. 1 is a flow diagram illustrating the web interface that receives user input and displays individual parts to the user in one embodiment of the present invention. At 102, user interface such as a web page is presented to the user for entering equipment or parts by, e.g., equipment number or parts number respectively, for nesting. At 104, the user enters a job number or scans in a bar code from the equipment configuration drawing. The drawing may have been previously obtained through the on-line equipment configuration as described in the related U.S. Patent Application entitled "Method and System for Designing and Ordering Products for Manufacture On-Line." At 106, the parts information for the job is retrieved from the parts data 114 stored, e.g., in one or more database tables. Using the parts information, it is determined what parts are necessary to build the equipment specified by the user.

At 108, the parts data is verified by accessing and retrieving gauge information, e.g., stored in the gauge info database table 118. The gauge_info table contains information about the material the part is to be made from. Gauge info table, e.g., includes material thickness needed for the part, and may be specified in ranges. This information is checked for validity, to insure that parts may be properly sorted prior to nesting. At 110, data input by user is saved, e.g., in nc_inputs database table 120. User input is stored to save this nesting session configuration. This saving of user inputs allows users to return to the session, e.g., if incomplete or to request the actual manufacturing or processing to begin. At anytime during the data entry, users may verify the entered data and modify the data.

Briefly, nc_inputs table holds the part and unit/order inputs that the user enters when setting up the nest. This table is linked back to nc_nest database table by the nest_id and location. After nesting is completed, nc_inputs table is used to compare what the user requested, with what actually nested (nc_parts & nc_plates). There is a status field in this table, which is set differently depending on: if the part was too large to nest, the part fits on precut material, the part was "On Hold", etc. The database table information is described in more detail below.

At 112, the parts list for assembly is displayed to the user, e.g., on a web page. In one embodiment, users may modify quantities of objects to nest, e.g., if all the parts specified do not fit in one sheet of metal. Users may also submit the nested parts for processing or manufacturing, e.g., when they approve of the nested parts displayed on the web page.

Figure 2:
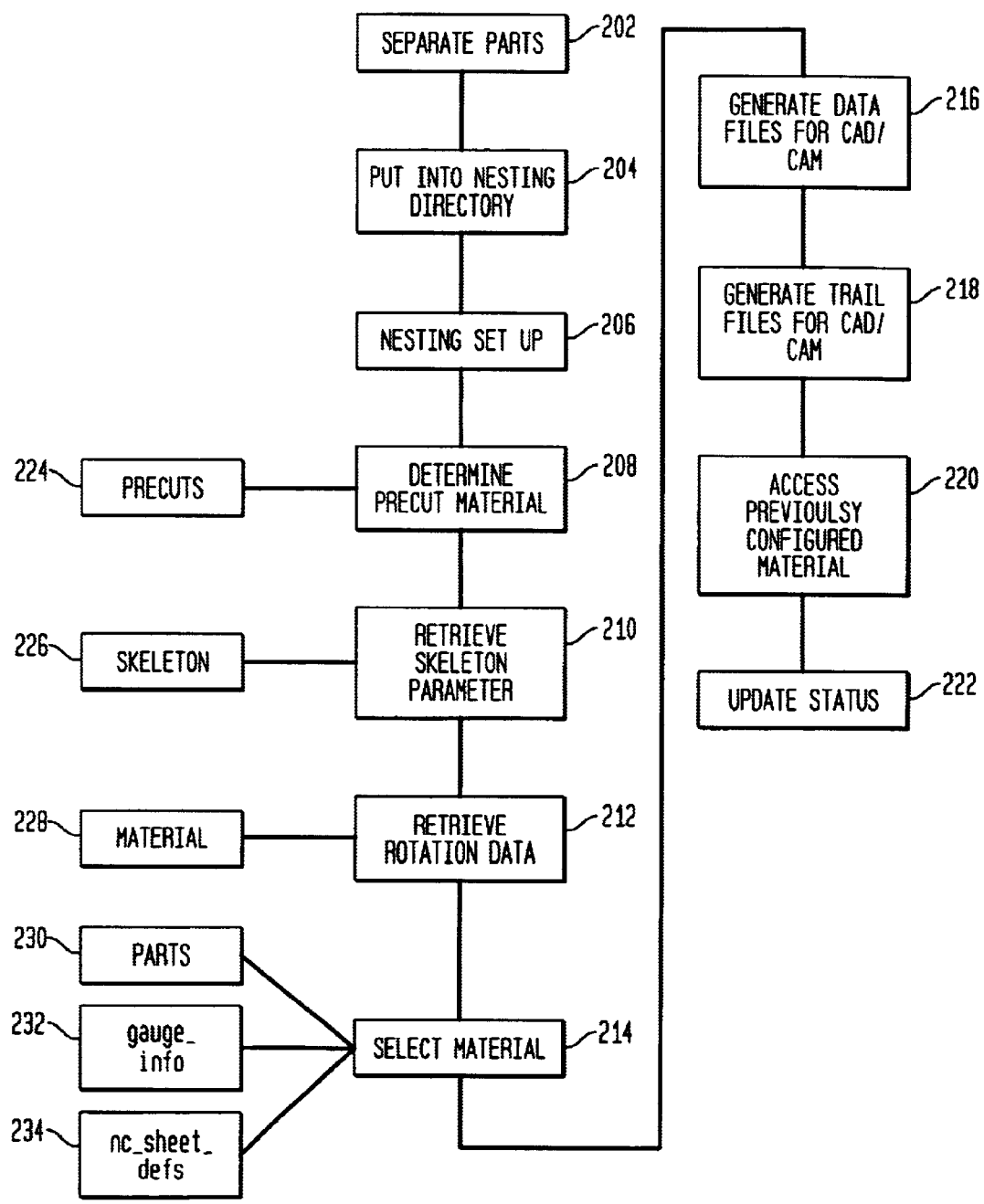
FIG. 2 is a flow diagram illustrating the automatic nesting setup in one embodiment of the present invention.

FIG. 2 is a flow diagram illustrating the automatic nesting setup in one embodiment of the present invention. At 202, the identified parts required for the configured equipment are separated by material types. That is, parts to be cut from the same material type are grouped together. Similarly, the parts may be separated according to their gauges. In one embodiment, these parts are separated and data for the parts are written or stored into different directories in a file system, referred to as nesting directories as shown at 204. The method of storing and separating the parts into material and gauge types, however, is not limited to the method described above.

At 206, the nesting set up procedure begins, e.g., by determining various parameters associated with the parts. At 208, a check is performed to determine if a part fits on a precut material. Precut database table 224 that stores the precut parts is examined to determine this. If the part can fit on a precut material, this part need not be nested on the sheet.

At 210, skeleton parameters such as size of top, bottom, left, right margins and borders, amount of material left between parts, are retrieved from, e.g., skeleton database table 226. At 212, rotation data is retrieved, e.g., from a material database table 228, to determine which ways the part may be rotated on the sheet metal. This is important since some materials contain a directional finish, such as brushed aluminum or stainless steel. E.g., x-axis of the grain coordinate system may need to be aligned with the grain.

At 214, material is selected for the sorted parts by examining the data stored in parts 230, gauge_info 232, and nc_sheet_defs 234 database tables. E.g., part size, material name and gauge are selected from the parts table, material code is selected from the gauge_info table, and an available sheet of material is selected from the nc_sheet_defs table based on part size and material code. In one aspect, each material may have a priority number assigned to the material. The priority number is an indication of which material should be used first, and may be based on the size of the material and the part being nested. E.g., a sheet that has the highest priority and that which accommodates the largest part required may be selected. The data retrieved is used to generate data files used by a CAD/CAM program which optimally arrange the parts on a selected material.

At 216, data files are generated for CAD/CAM program. These data files include nc_sheet.dat, control_vars.dat, <nest_id>.nst. Nc_sheet.dat data file includes information such as sheet size. Control_vars.dat data file includes nesting control variables such as skeleton size and rotation information. <nest_id>.nst data file includes a list of parts to be nested by id numbers. These data files are read and the data used as parameters by the CAD/CAM program during the actual placing of the parts on the sheet metal.

At 218, trail files are generated. The trail files are typically used as input files to a CAD/CAM program. These trail files include commands required to start the session of a CAD/CAM program such as Pro/E, and configure the nesting process. At 220, a session of a CAD/CAM program is started using the trail files. The data files previously configured are used to set the nesting environment and the parts required for the nest.

At 222, the status for objects in the users' original nest configuration is updated. Each part that was included in a nest is marked with the nest_id in the database. This allows the user to view a report of the original request and see which parts nested and which parts did not.

In optimally arranging the parts on a sheet or material, consideration is also made as to the optimal size of the sheet or material that fits the parts such that minimal amount of scraps are left over.

FIG. 3 is a flow diagram illustrating automatic nesting procedure in one embodiment of the present invention. At 302, a program is created to edit the output files generated by a CAD/CAM program such as Pro/E. At 304, a dynamic trail file is also created. The trail file includes the commands that are used to complete the session of Pro/E. At 306, the CAD/CAM output file is parsed and saved. The raw output from the CAD/CAM program, e.g., Pro/E, is processed to generate a computer numerical control ("CNC") program file for the laser cutting equipment. E.g., Pro/E session generates an output data having information about the arranged parts on a sheet of material. This output data is then used to generate a program that instructs lasers to cut the sheet of material according to the configuration or arrangement generated during the Pro/E session.

At 308, status for objects in the users' original nest configuration is updated. Each part that was included in a nest is marked with the nest_id in the database. This allows the user to view a report of the original request and see which parts nested and which parts did not.

FIG. 4 is a flow diagram illustrating the post nesting procedure in one embodiment of the present invention. At 402, plot files are saved for reprints or later access and use. At 404, plot files may also be printed automatically on a printer selected by a user. At 406, the nests that are actually cut are tracked, e.g., by detecting which nests had laser programs downloaded to the laser. At 408, reports may be generated to show user configuration results or overall efficiency. At 410, the method and system of the present invention allows user to renest, e.g., the entire nesting configuration, specific sheets only, or specific materials only.

In one embodiment, various web interfaces are provided as user interfaces for nesting. The web interface includes one or more web pages. These web pages use JavaScript and PHP coding to handle the various tasks of validating inputs, communicating with the database, and interacting with the file systems. The web interface includes web pages that may be used to configure parameters related to nesting and post processing.

Work zones and clamps web page allows control over the size of the work zone, i.e., how far the machine cuts before a reposition, the number of clamps, and the location of each clamp. Clamp location may also be noted on the nest drawing.

Skeleton parameters web page allows control over the size of the border, e.g., bottom, top, left, and right, as well as the amount of material left between parts. As known to those skilled in the art, shaker tabs are used to hold parts in the sheet while being cut. Tab spacing web page in one embodiment of the present invention allows tab spacing to be controlled based on cut perimeters. E.g., tab placement may be controlled by quantity and spacing. A quantity of tabs may be specified for a given range of cut perimeters. This method may be used on cuts with a perimeter, e.g., up to 3,000 millimeters ("mm"). In addition, minimum tab spacing may be specified, and a program may be used to automatically calculate the number of tabs required.

Precut parameters web page specifies the tolerances to be used to determine if a part fits on a precut sheet. For example, if the tolerance is set to 1 millimeter ("mm"), any part that is within 1 mm of the precut sheet size in both directions would not be included in the nest. Cutting data web page allows users to control, e.g., tab size, cutting code, laser code, and pierce dwell time for each material and gauge. Cut code and laser code are material codes used by lasers to set up cutting data on cutting machines.

In one embodiment, various web interfaces are provided as user interfaces for nesting. The web interface Includes one or more web pages. These web pages use JavaScript and PHP (PHP is a script language and interpreter that is freely available; PHP, originally derived from "Personal Home Page Tools", now stands for "PHP: Hypertext Preprocessor") coding to handle the various tasks of validating inputs, communicating with the database, and interacting with the file systems. The web interface includes web pages that may be used to configure parameters related to nesting and post processing.

In one embodiment, available sheets of material are stored in the nc_sheet_defs database table. Each material is classified by a unique number, e.g., BPCS (Business Planning and Control System) BOM (bill of material) number. This number is used to reference the specific material and gauge stored in the ERP (Enterprise resource planning) system. Each sheet also has a unique item number that identifies the specific sheet size of a given material. Also stored in the nc_sheet_defs database table are length and width of sheet in millimeters, and priority number ranging from 0 to 10. In one embodiment, the nesting is done on the highest priority sheet that fits the largest part in the group to be nested. Sheets with a priority of 0 are not be used, and indicate that a material is no longer used, or is out of stock.

In one embodiment, a list of precut material are entered and stored, e.g., in precuts database table. During preprocess or before the parts are nested, each part is compared to the list of available precuts, and if it is within specified tolerances, the part is not nested, and shows up on the nesting report as being precut.

Figure 5:
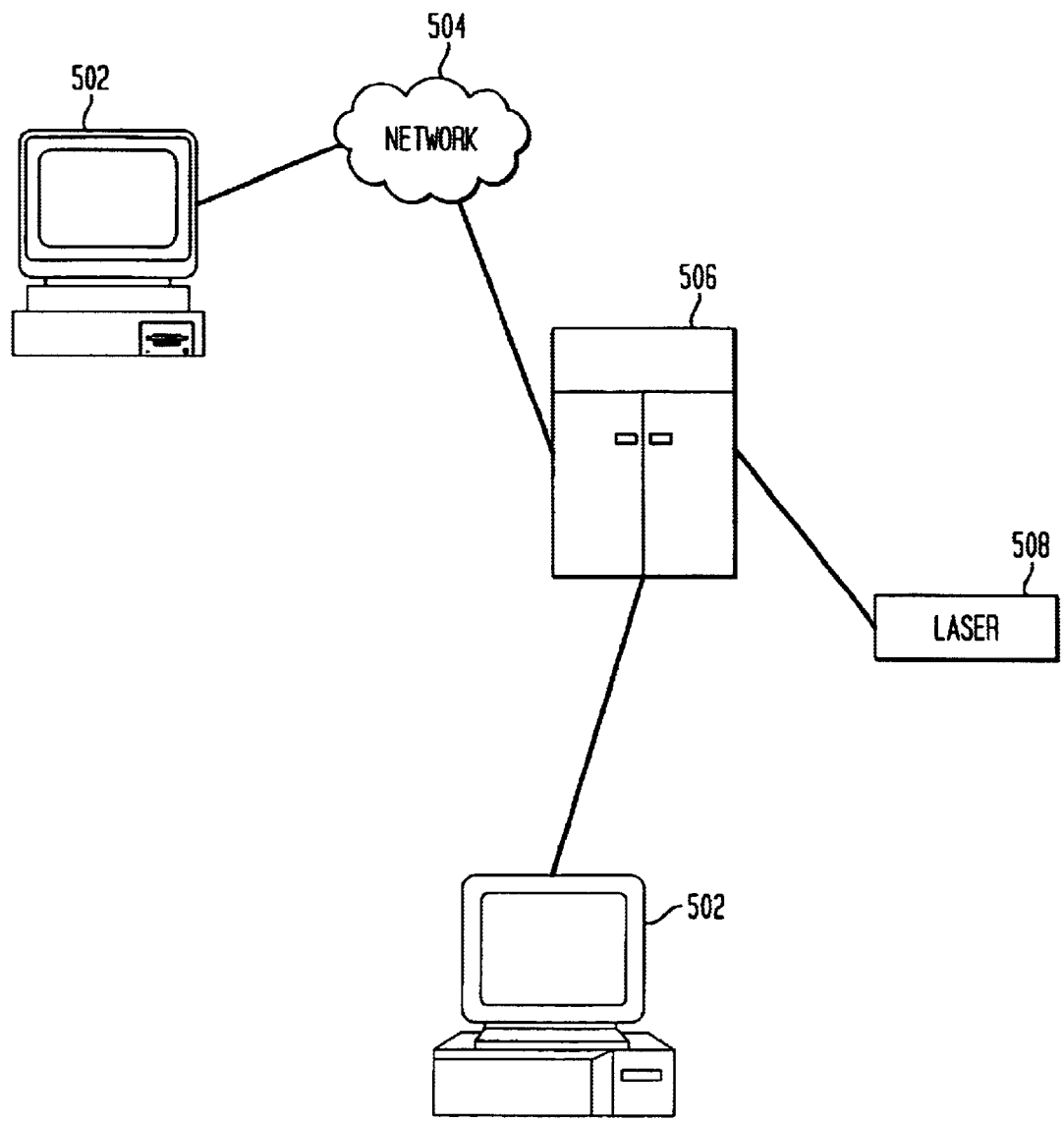
FIG. 5 is a diagram illustrating architectural overview of a nesting system in one embodiment of the present invention.

FIG. 5 is a diagram illustrating architectural overview of a nesting system in one embodiment of the present invention. User interface 502 is provided to allow a user to enter, e.g., by typing or scanning the part numbers that are to be nested. Other input data that may be entered on the user interface 502 may include, but not limited to, equipment unit numbers, customer's job number, item number, and size of scrap material available that may be used. The user interface 502 may reside with user computer which may be connected over a network 504. The interface 502 may also reside locally with the nesting system 506, e.g., with a server computer. The nesting system 506 is described in detail with reference to FIG. 6. The nesting system 506 may further be connected to a laser 508, e.g., over a network 504. The network 504 may be remote or local. The laser 510 receives commands and parameters for cutting the parts.

Figure 6:
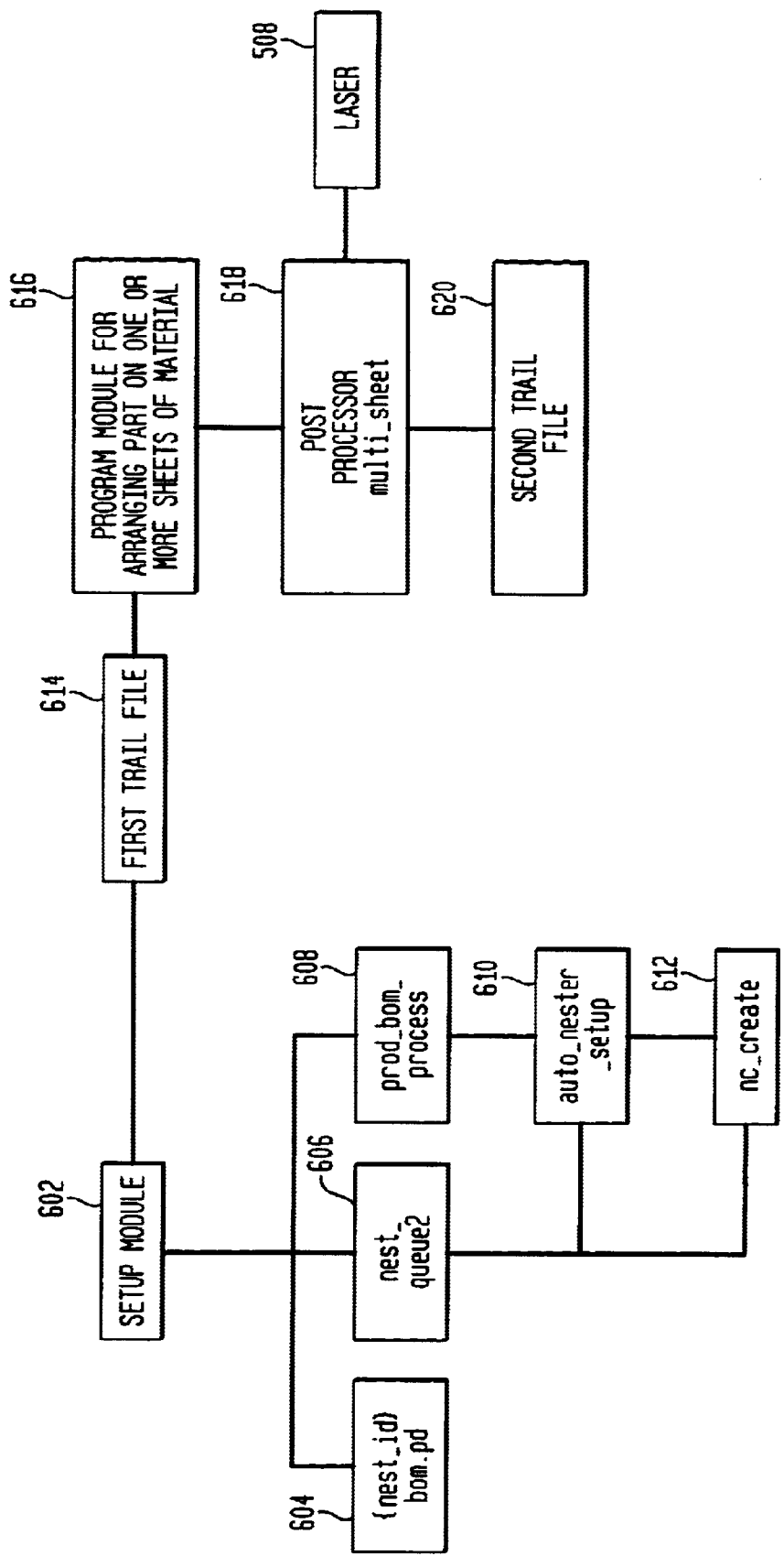
FIG. 6 illustrates a nesting system in one embodiment of the present invention.

FIG. 6 is a diagram illustrating a nesting system in one embodiment of the present invention. Setup module 602 creates a file, e.g., {nest_id}bom.pd, 604 that includes the data received via the user interface (502 FIG. 5), where the {nest_id} may be a number generated based on current time, or the time when the data was entered. A command, e.g., prod_bom_process 608 that processes the {nest_id}bom.pd 604 is entered in a database table, e.g., nest_queue2 606. Prod_bom_process 608, e.g., creates subdirectories for storing the parts according to their material and gauge types. Prod_bom_process 608, e.g., also calls auto_nester_setup process 610 that creates files needed for nesting.

Auto_nester_setup 610 creates files and copies parts information to individual files. The files may include, but are not limited to, parts file that contains the geometry for each part, parts_id file that lists all parts to be nested, material information data files that describe a sheet of material, e.g., by material type, thickness, length, width, gauge, id number, and priority number. The priority number indicates which material to be used first and may be based on what type of material is currently available in the shop. Auto_nester_setup 610 also filters out any parts that are determined to be precuts.

Auto_nester_setup module also enters more commands into nest_queue2 table 606. A command entered may include, e.g., nc_create 612, which creates trail files 614 for each material type used in the nesting. Trail files 614 are input to CAD/CAM program 616 such as Pro/E to run and arrange the parts on a sheet of material. CAD/CAM program typically includes software used to design products and devices and may be any available off-the-shelf CAD/CAM programs. Alternatively, CAD/CAM program may be in-house built software that is implemented to perform the functions of CAD/CAM programs. Trail files 614 include commands such as getting license for CAD/CAM program, and reading control information for CAD/CAM program.

Control information for CAD/CAM program includes clamp location, work zone size, and the parts information as set up from auto_nest_setup module 610. Nc_create 612 then calls or executes CAD/CAM program 616 with a trail file 614. CAD/CAM program 616 such as Pro/E reads in the trail file 614 and as a result places parts on a sheet of material. Output from a CAD/CAM program includes data such as how many sheet of material were used and how the parts are arranged on the sheets of material. CAD/CAM output also includes text commands for laser to cut the sheets.

When the CAD/CAM program 616 has arranged the parts on one or more sheets of material, the CAD/CAM program 616 is instructed to call or run another program, e.g., multi_sheet 618 to build a second trail file to continue the CAD/CAM processing and any other post processing. The second trail file 620 may be a shell script, e.g., post_script.sh, that processes output from the CAD/CAM program to create laser program to cut the parts. E.g., text description of laser commands that are generated by CAD/CAM program 616 are converted by the post processor into actual commands that a laser would understand. The commands include where to cut or punch a hole, and may be different for different lasers used. The second trail file 620 is then again input to the CAD/CAM program to continue running. The laser command file generated in the present invention is ready to be input to the laser 508 to initiate cutting. Drawings for each sheet of material may be generated after the second trail file 620 Is run. Users may request these drawings via e-mail or request a copy to be printed on their local printers.

In one embodiment, the system and method of the present invention allows a user to perform renesting. Renesting may be done at different levels, e.g., from a nest report or from a nesting interfacing. From the nest report, user may click a button to renest single plate or sheet, entire material, or all un-nested parts. Un-nested parts are parts that were not included in the original nest because they were too large, they were on-hold, they contained bad geometry, or the material they were to be nested on was not available. Renesting may also be performed from a separate nesting interface, e.g., a web page.

Renesting in the present invention is easily achieved because, e.g., general nest data is automatically generated during the nesting procedure and saved, e.g., in the nc_nest database table. Identity of the user, printer, and other parameters that the user specified previously are typically retrieved from cookies stored in the user's browser. A new nest_id is generated for this renesting session and the sheet/material selected to renest is queried to find all the parts and make new entries under the new nest_id.

During nesting, certain parts may be designated as hold parts. Hold parts are those that are withheld from a nest so they may be nested later. E.g., certain CAD/CAM programs such as Pro/E models may be programmed to set a parameter "HOLD_ID." A part may be placed on hold because, e.g., it will be processed in large batches. In the present invention, users may accumulate those hold parts until the time the user wishes to process them, e.g., as the batch.

A program that performs shop prints may, e.g., be programmed to recognize this HOLD_ID. When a part that is tagged with HOLD_ID, is placed in a nest configuration, that part may be filtered out and placed in a separate database table, e.g., "nest_ready". The parts that are on hold may be selected later from within the nesting web interface by selecting, e.g., the "On Hold" button which allows nesting of the held parts.

In one embodiment, the present invention also allows users to manage permanent program numbers on-line, e.g., by providing a web interface. Permanent program numbers are references to standard CNC (computer numerical control) programs for use with a laser or turret punch that have been previously written and are continuously reused on parts that are difficult to program or are run in large volumes. The web interface for managing permanent program compares the assigned part number with the existing permanent program number, e.g., stored in database table "perm_nums." If during pre-processing, the part is found to match an existing program, the part will not be nested.

The following database tables may be used in the present invention:

NC_NEST: This table holds generic information about the nesting order such as NEST_ID, printer, custom blank size, etc. The primary key in this table is the combination of the nest_id and location.

NC_INPUTS: This table holds the part and unit/order inputs that the user enters when setting up the nest. This table is linked back to nc_nest by the nest_id and location. After nesting is completed, this table is used to compare what the user requested, with what actually nested (nc_parts, nc_plates). There is a status field in this table that is set differently depending on if the part was too large to nest, the part fits on precut material, the part was "on Hold", etc.

NC_PLATES: This table holds information about individual plates/sheets that are created during the nesting process. It is linked back to nc_nest by the nest_id and location. This table also has a unique identifier field that is used to link the entries in nc_parts to the sheet's entry. The other information saved in the table includes material usage numbers, count of parts on the sheet, material, gauge, and quantity. Data stored here is used for reporting as well as renesting.

NC_PARTS: This table includes a minimal amount of information that is put there during nesting. Specifically, the part to plate/sheet link as well as quantity and part name and igs numbers. This table is keyed on four fields, nest_id, plate_id, location, and part_id (igs number). Every part placed on a nest sheet is put into this table. Data stored here is used for reporting as well as renesting.

In the above-described database tables, each entry in nc_nest may have infinite associated entries in nc_inputs. Each entry in nc_nest may have infinite associated entries in nc_plates. Each entry in nc_plates may have infinite associated entries in nc_parts. An entry in nc_parts may be directly linked to both nc_plates and nc_nest and also to nc inputs. An entry in nc_plates may be directly linked to nc_nest. Entries in nc_inputs may be directly linked to nc_nest.

The following files may be used in the nesting process.

Control_vars.dat includes controls part offset or skeleton, display parameters, and clustering parameters. This file is created by the control_vars function in nc_create. It runs skeleton_info and rotate_info to get skeleton and rotate parameters from the database.

Lc667ii.gph includes default work cell configuration. This work cell is configured for lasers, but may be overridden by values retrieved from the database. This is loaded by the load_work_cell function in nc_create.

LcG67ii.cel includes work cell values extracted from the database during nest processing. It is created by machine_param_builder. These values replace those from the default work cell file. This configuration allows the work cell parameters to be maintained via a web interface. This file is read in by the read_machine_params in nc_create.

<nest_id>.dat includes order list. This file includes a list of part names to be nested and the quantity ordered. This file also has a field for priority, offset, hole offset, rotation, flip, and grain. The file also may include a field for results that is not used.

<nest_id>.lst includes two column list of part name and quantity.

<nest_id>.nst include two column list of id number and quantity.

<nest_id>.res includes sheet usage results. This file may be use as output from CAD/CAM program and may list the percentage of the sheet used by borders, parts, inside areas, total used, and total unused.

Lcd_files.lst includes two column list of manufacturing model name and nest_id.

Mfg001.smi includes nest sheet report showing manufacturing model name, sheet quantity, part names and quantities contained on that sheet.

Nc_sheet.dat includes data about the sheet of material to nest parts on. This file may include length, width, thickness, border information, and grain direction. Thickness is set to 2 to avoid relative accuracy problems that occur with large thin sheets. This file may be read into CAD/CAM program such as Pro/E.

Nesting_material includes single line, colon delaminated information about the material. This file is created by a sheet selection program and is used to build the nc_sheet.dat file.

Part_id_table includes three-column text with id number, part name, and quantity.

Post_script.sh includes shell script that processes the results file, strips any feed rate information from the cutting data, runs the post processor, and copies the laser programs to the appropriate location.

Results.res includes sheet usage results that are used if there is one sheet.

<nest_id>.ncl.1 includes cutting code output from CAD/CAM program. This file is post processed for the machines.

<nest_id>.txt includes CAD/CAM trail file that is used to begin the automation. This file runs until all parts have been loaded onto the sheet. It then runs _ipt2 map key that writes ipt.txt trail file to finish off the operations.

Ipt.txt includes trail data that is created from within the running session of CAD/CAM by the _ipt2 map key. This file is created after the parts have been loaded and shows how many sheets of material have been used. This file is used to generate the tool path for each sheet, create a ruler on each sheet, and create a drawing for each sheet.

The method and system of the present invention may be implemented and run on a general purpose computer. The communication network described may be any communication network used in communicating data, including but not limited to the Internet, World Wide Web, Wide Area Network, Local Area Network, and wireless network.

While the invention has been particularly shown and described with respect to a preferred embodiment thereof, it will be understood by those skilled in the art that the foregoing and other changes in form and details may be made therein without departing from the spirit and scope of the invention.

We claim:

1. A method for automatic sheet nesting of equipment parts, comprising:
   receiving data associated with one or more parts to nest over a network;
   sorting the parts by material type;
   determining an arrangement of the parts on a sheet of material for each material type;
   generating a laser program to cut the parts;
   determining if anyone of the parts can fit on a precut material, and if a part can fit on a precut material,
   excluding the sorted part from placing on the sheet of material.

2. The method of claim 1 wherein the method further includes: generating a list of parts that are arranged on a sheet of material.

3. The method of claim 1, wherein the method further includes:
   allowing a user to modify the arrangement by entering one or more parameters that affect the arrangement.

4. The method of claim 1, wherein the network includes the Internet.

5. A method for automatic sheet nesting of equipment parts, comprising:
   receiving an equipment identifier associated with an equipment; and
   identifying one or more parts in the equipment for nesting, the equipment identified by the equipment identifier
   receiving data associated with the one or more parts to nest;
   sorting the parts by material type;
   determining an arrangement of the parts on a sheet of material for each material type;
   generating a laser program to cut the parts.

6. The method of claim 5, wherein the sorting further includes selecting suitable sheet material for the parts.

7. The method of claim 5, wherein the sorting further includes creating separate computer file system directory for each material type.

8. The method of claim 5, wherein the method further includes:
   generating a list of parts that are arranged on a sheet of material.

9. The method of claim 8, wherein the method further includes:
   allowing a user to modify the arrangement by entering one or more parameters that affect the arrangement.

10. The method of claim 9, wherein the one or more Parameters include tab spacing.

11. The method of claim 9, wherein the one or more parameters include skeleton parameters.

12. The method of claim 9, wherein the one or more parameters include work zone size.

13. The method of claim 9, wherein the one or more parameters include clamp number.

14. The method of claim 9, wherein the one or more parameters include clamp location.

15. The method of claim 5, further including:
    transmitting the laser program to a laser to initiate cutting.

16. The method of claim 5, wherein the receiving data further includes:
    receiving data associated with the one or more parts for nesting via a user interface accessed over a computer network.

17. The method of claim 5, further including:
    receiving data associated with the one or more parts for nesting via a web interface.

18. A method for automatic sheet nesting of equipment part, comprising:
    providing a user interface over a communication network;
    receiving via the user interface over the network, an equipment identifier associated with an equipment for nesting;
    determining one or more parts associated with the equipment to nest;
    sorting the one or more parts by material type;
    transmitting information associated with the one or more parts to optimally arrange the one or more parts on one or more sheets of material;
    receiving arranged information about the parts;
    generating a laser program to cut the parts according to the arranged information; and
    displaying the arranged information on the user interface.

19. The method of claim 18, wherein the user interface includes a web enabled interface.

20. A computerized system for nesting equipment parts, comprising:
    user interface module for entering data associated with one or more parts to nest;

a setup module that receives the data including at least an equipment identifier from the user interface module, associates one or more parts with the equipment identified by the equipment identifier, associates the one or more parts with one or more sheets of material, the setup module generating one or more data and command files for nesting;

a program module in response to receiving the one or more data and command files, generating an optimal arrangement of the one or more parts on one or more sheets of material, the program modules further generating one or more text commands for laser for cutting the one or more parts according to the optimal arrangement;

a post processing module, in response to receiving the one or more text commands, operative to convert the text commands into laser commands.

21. The system of claim 20, wherein the user interface module include a web-enabled user interface.

22. A program storage device readable by machine, tangibly embodying a program of instructions executable by the machine to perform method steps of automatic sheet nesting of equipment parts, comprising:

providing a user interface over a communication network; receiving via the user interface over the network an equipment identifier associated with an equipment for nesting;

determining one or more parts associated with the equipment to nest;

sorting the one or more parts by material type;

transmitting information associated with the one or more parts to arrange the one or more parts on one or more sheets of material;

receiving arranged information about the parts;

generating a laser program to cut the parts according to the arranged information; and displaying the arranged information on the user interface.

* * * * *